UNITED STATES PATENT OFFICE.

THOMAS B. KERR, OF KANSAS CITY, KANSAS.

REFRACTORY COMPOSITION.

SPECIFICATION forming part of Letters Patent No. 415,170, dated November 12, 1889.

Application filed June 3, 1889. Serial No. 312,969. (Specimens.)

*To all whom it may concern:*

Be it known that I, THOMAS B. KERR, a citizen of the United States, residing at Kansas City, in the county of Wyandotte and State of Kansas, have invented a new and useful refractory composition of matter to be used for lining boiler-furnaces, ranges, cook and heating stoves, smelting-furnaces, and all manner of fire-chambers, and boiler-covers for retaining steam and for covering or lining any surface exposed to intense heat, of which the following is a specification.

My composition consists of the following ingredients, combined in substantially the following proportions, to wit: soapstone, one thousand pounds; burnt fire-clay, three hundred pounds; soft-coal cinder, five hundred pounds; common sand, one hundred pounds; ordinary Portland cement, ten pounds; common salt, ninety pounds. All the said ingredients except the sand are to be ground together, and then made into a plastic mass by adding the sand and sufficient quantity of water and mixing all together.

I use the compound in a plastic, wet, or green state by applying it to the walls of the furnace exposed to the fire to the thickness of about one inch, varying the thickness as circumstances and the character of the fire-chamber or furnace may require. I then perforate the compound thus applied and place a fire in the furnace next the said compound, which sets active the flux, and the compound becomes hard, making a very durable lining for such fire-exposed surfaces. These perforations are made in the compound or mixture for the purpose of aiding steam to escape while the compound is being first heated after being applied to a fire-surface, and thereby prevent the composition from cracking while being heated and baked.

The composition thus compounded may be packed away for use when desired, and will remain in such plastic condition for some considerable time, and if hardened somewhat by action of the air may be rendered plastic again by adding water and mixing it as before.

Having thus described my invention, what I claim as new, and desire to secure by Letters Patent, is as follows, to wit:

The herein-described composition of matter to be used for lining furnaces, fire-boxes, smelting-furnaces, and the like, consisting of soapstone, burnt fire-clay, soft-coal cinder, common sand, cement, common salt, and water, in the proportions specified.

THOMAS B. KERR.

Witnesses:
NICHOLAS MCALPINE,
D. M. SWAN,
W. N. WOODWARD.